United States Patent
Azran et al.

(10) Patent No.: US 6,270,714 B1
(45) Date of Patent: Aug. 7, 2001

(54) METHOD FOR POTTING OR CASTING INORGANIC HOLLOW FIBER MEMBRANES INTO TUBE SHEETS

(75) Inventors: Avraham Azran, Rechovot; Gil Dagan, Meytar, both of (IL)

(73) Assignee: Carbon Membranes Ltd., D.N. Arava (IL)

(*) Notice: Subject to any disclaimer, the term of this patent is extended or adjusted under 35 U.S.C. 154(b) by 0 days.

(21) Appl. No.: 09/259,515

(22) Filed: Feb. 25, 1999

(30) Foreign Application Priority Data

Feb. 26, 1998 (IL) .......................................... 123462

(51) Int. Cl.[7] .......................... B29C 39/10; B29C 45/14; B29C 45/46; B29C 45/70; B29C 65/08
(52) U.S. Cl. ........................ 264/443; 264/442; 264/478; 264/69; 264/328.1; 264/328.2; 264/331.11
(58) Field of Search ................... 264/443, 442, 264/69, 328.1, 328.2, 330, 331.11, 478, 71

(56) References Cited

U.S. PATENT DOCUMENTS

| | | | |
|---|---|---|---|
| 2,434,557 | * 1/1948 | Fox, Jr. et al. | |
| 3,932,570 | 1/1976 | Cox et al. | 264/69 |
| 4,220,489 | * 9/1980 | Coplan et al. | 156/73.6 |
| 4,323,454 | 4/1982 | Fritzsche et al. | 210/321.1 |
| 4,685,940 | 8/1987 | Soffer et al. | 55/158 |
| 4,793,954 | * 12/1988 | Lee et al. | 264/23 |
| 4,929,259 | 5/1990 | Caskey et al. | 55/158 |
| 4,975,247 | * 12/1990 | Badolato et al. | 422/48 |
| 5,182,053 | * 1/1993 | Creasman et al. | 264/1.4 |
| 5,445,771 | * 8/1995 | Degen | 264/22 |
| 5,531,848 | * 7/1996 | Brinda et al. | 156/77 |
| 5,575,963 | 11/1996 | Soffer et al. | 264/36 |
| 6,190,601 | * 2/2001 | Nakamura | 264/443 |

FOREIGN PATENT DOCUMENTS

| | | |
|---|---|---|
| 0 671 202 A2 | 9/1995 | (EP) . |
| 2 518 412 | 6/1983 | (FR) . |
| 2 518 421 | 6/1983 | (FR) . |
| 1-242219 | 9/1989 | (JP) . |
| 5024052 | 2/1993 | (JP) . |
| 05161829 | 6/1993 | (JP) . |
| 12-150283 | * 5/2000 | (JP) ........................ H01F/41/02 |

OTHER PUBLICATIONS

Way, J.D. and Roberts, D.L., "Hollow Fiber Inorganic Membranes for Gas Separations," *Separation Science and Technology*, 21(1):29–41 (1992).

Zolandz, R.R. and Fleming, G.K., "Applications." In *Membrane Handbook*, W.S. Winston Ho, Ph.D. and Kamalesh K. Sirkar, Ph.D., eds. (N.Y.: Van Nostrand Reinhold), pp. 78–94 (1993).

* cited by examiner

Primary Examiner—Jan H. Silbaugh
Assistant Examiner—Michael I. Poe
(74) Attorney, Agent, or Firm—Hamilton, Brook, Smith & Reynolds, P.C.

(57) ABSTRACT

Method for potting or casting hollow fiber bundles and form a tube sheet as part of fabricating a gas separation membrane module. A hollow fiber bundle is placed in a mold, into which a resin filled with solids injected, and the resin is exposed in a liquid bath in which the mold is immersed, to an ultrasonic field while it is so injected. The solids may be chosen among metals, metal oxides, silica, quartz, ceramics and inorganic salts.

12 Claims, 2 Drawing Sheets

METHOD FOR POTTING OR CASTING INORGANIC HOLLOW FIBER MEMBRANES INTO TUBE SHEETS

BACKGROUND OF THE INVENTION

Gas separation membranes are widely used today to separate gaseous mixtures in various industries including to recover hydrogen in the petrochemicals industry, generating nitrogen from air, and generating enriched oxygen from air to name just a few examples. Examples of the applications of such membranes can be found in a number of references (see for example, *Membrane Handbook*, Ho and Sirkar eds., Van Reinhold Nostrand, 1992). These membranes selectively permeate one gas more readily than another when subjected to a pressure difference between the high pressure and low pressure side of the membrane. Therefore it is critical to maintain a gas-tight seal between the high pressure and the low pressure side of the membranes, because any non-selective flow through leaks will destroy the separatory power of the membrane module. In the terminology of gas separation technology, such membrane modules are usually denoted as permeators.

A number of geometries have been used to pack a plurality of membranes into a pressure housing and maintain a gas-tight separation between the two sides of the membrane. The two most commonly used are spiral wound permeators and hollow fiber permeators. Because of the higher packing density afforded and the less difficult problem of pressure drops and fouling in gas as opposed to liquid separations, hollow fiber gas permeators tend to be the most widely used The sealing of the hollow fiber permeators, so that the hollow fibers lumen is kept separate from the outer surface of the hollow fibers, is usually effected by forming a tube sheet around the end of a fiber bundle. By "tube sheet" is meant herein substantially disk-like structure, which comprises a plurality of open, hollow fibers and a solid substance completely filling and sealing the spaces between the outer surfaces of the fibers. The tube sheets are usually formed at or near one end or both ends of the fiber bundle and their thickness is a fraction of the length of the bundle. If the feed gas mixture is fed to the outside surface of the tube bundle, then the bundle can be bent over in two in a U shape and the both ends of the bundle can be potted in a single, common tube, the permeate being collected from the lumen. Alternatively, if the permeate is not collected from one end of the bundle, said end can be sealed with a resin. Further alternatively, both ends of the fiber bundle can be fixed in a tube sheet and the permeate can be removed from the fiber lumen at both ends of the module. If the feed gas mixture is fed to the fiber lumen, then a separate tube sheet must be formed around each end of the bundle. All of the above arrangements of hollow fibers in modules are well documented in the patent literature and well known to persons skilled in the art.

To form a tube sheet, some form of resinous or other plastic or glue-like material must be caused to flow between the individual fibers and fill all the interfiber interstices, so that no gaps are left between the fibers to allow a flow leak. A wide variety of thermoplastic and thermosetting materials are used for this purpose and reported in the patent literature. These include epoxy resins, polyurethane resins, silicone resis, liquid rubber, various other thermoplastic and thermosetting polymers.

These resins can be applied to the fiber bundle in several ways including by a:

a—Pouring the liquid resinous casting material into a mold in which the ends of the fiber bundle have been previously placed and then allowing the mixture to harden. This is often done under a centrifugal force field generated by sprig the fiber bundle on an axis perpendicular to the longitudinal axis running along the length of the bundle.

b—Injecting the liquid resinous casting material into a mold from the bottom out of which the ends of the fiber bundle extend. Often such a mold is formed by the pressure housing in which the hollow fiber bundle is retained (see e.g. Jap. 5,161,829). Similarly, the fiber ends are clogged with a quick-setting resin to prevent the casting resin from filling the fiber to the height of the tube sheet casting. After the tube sheet is formed, the fiber ends are cut open to unclog the pre-sealed fibers (see e.g. Jap. 5,161,829).

c—Slowly inserting the fiber bundle into a mold already containing the liquid resin.

In the terminology used in this patent application, casting refers to forming a tube sheet around a fiber bundle end within a mold, said mold being subsequently discarded. Potting will refer to forming a tube sheet around a fiber bundle end, in which the walls of the said mold, used to form the tube sheet, become a mechanical element in the pressure module assembly, In casting or potting the tube sheet, the following mechanical/materials requirements must be met.

1. Ensuring adhesion between the liquid resinous casting material and the hollow fibers.
2. Ensuring complete penetration of the liquid casting material between the fibers of the fiber bundle, so that all the spaces are filed up and no gaps or channeling are caused.
3. Preventing wicking, which the climbing of liquid resin up individual fibers to a height much greater than the general level of the tube sheet. Such wicking leads to lack of control in determining the extent/dimension of the tube sheet, and can lead to formation of sharp stiff surfaces around the individual fibers against which they can break or crack.
4. Matching the linear coefficient of thermal expansion (LCTE) of the fibers, the tube sheet, and—if the tube sheet is formed to adhere and chemically seal against the pressure housing—the pressure housing. Otherwise operating at different temperatures than the setting temperature will generate differential expansions of the pot material and the fiber and/or housing, generating strains leading to cracks.

The first two requirements can be met by choosing a resin of low enough viscosity and properties which cause the resin to wet the fibers. However these are exactly the requirements that will exacerbate the problems of wicking.

Matching the LCTE can be done by filling the resins which have typical LCTE's of 80–250 ppm/° C. with a filler of powder with a lower LCTE, such as metal or metal aoides, or quartz or other ceramics, which have lower LCTE's. However as the percent of filler increases, the viscosity increases and penetration of the fiber bundle becomes more difficult.

One of the most practiced methods to solve these problems with polysulfone hollow fiber membranes is that of U.S. Pat. No. 4,323,454. In this patent an epoxy resin, filled e.g. with aluminum or silica powder, is formulated with a crosslinking system including two curing agents, a viscosity increasing agent and a solidifying agent. The viscosity increasing agent results in the resin viscosity increasing rapidly after injecting the potting resin into the bundle, which helps prevent wicking as the curing reaction continues and the temperature increases due to the cure exotherm.

However, the solidification agent reacts much more slowly, so that the heat generated during the exotherm has time to be dissipated and there is a more uniform cure during the pot, leading to less strain. Wicking is usually less than 5 cm.

However, the system disclosed in. U.S. Pat. No. 4,323,454 is not effective for potting inorganic molecular sieve membranes. Such membranes, in the form of hollow fibers, have been developed and have combinations of high gas permeability and selectivities (e.g. J. D. Way and D. L. Roberts, Sep. Sci. and Technology, 27 (1992), pp. 29–41; Soffer et al, U.S. Pat. No. 4,685,940). These inorganic molecular sieve membranes have more extreme problems of potting because the LCTE of inorganic fibers is much lower than that of a polymer such as polysulfone (which is e.g. in the order of 50 ppm/C) and is no more than 10. The LCTE of glassy carbon hollow fiber membranes is about 5–6 ppm/C and that of silica hollow fiber membranes is even lower—<4 ppm/C.—while the LCTE of the tube sheet and of the pressure housing is higher, and this makes matching the LCTE difficult with inorganic fibers.

Wicking is a serious problem because of much lower values of elongation at break of inorganic fibers; e.g. carbon fibers have 1–2% elongation at break. Even the wicking up to 5 cm, reported in U.S. Pat. No. 4,323,454, is too high for potting hollow carbon fiber materials. A lower elongation at break indicates that the fiber is more brittle under deformation, and therefore more susceptible to breaking in the wicking region, when the difference of LCTE of resin and fiber leads to the deformation of the fiber on heating or cooling.

Therefore existing methods are inadequate to solve the problems connected with the potting of inorganic, particularly carbon, hollow fibers, which include; a) matching the LCTE of the resin with the low one of such fibers; b) preventing wicking; c) obtaining complete penetration of the fiber bundle by the resin. It is to be noted that wicking also causes miscalculation of the thickness of the tube sheet, as a portion of the glue climbs higher than the rest and the length of the contact between the cast resin and the mold that defines the tube sheet is correspondingly less.

SUMMARY OF THE INVENTION

The potting or casting method of the invention comprises placing a hollow fiber bundle in a mold, injecting a resin filled with solids into the mold, and exposing the resin to an ultrasonic field while it is so injected, preferably in a liquid bath in which the mold is immersed.

The fibers are inorganic ones, preferably carbon hollow fibers.

The solid-filled resin is of such a composition that it possesses the following properties:
1—LTCE on the order of 4 to 50 ppm/C, preferably 10–30 ppm/C
2—A viscosity of 1000 cps to 100,000 cps, and preferably between 10,000 cps to 80,000 cps.
3—A surface tension such that it wets the carbon fibers well.

The aforesaid LCTE are sufficiently low to be compatible with the LCTE of the carbon fibers a with that of the metal walls of the cylindrical mold in which the fiber bundle will be mounted in the pressure housing, when in use.

The resin is a thermosetting resin, preferably an epoxy or a polyurethane resin, and can be thixotropic or non-thixotropic. It is preferred that the solid-filled resin have a viscosity of 10,000 to 100,000 cps. and an LCTE of 45 ppm/C. more preferably less than 30 ppm/C when the fibers to be potted are of glassy carbon hollow fibers. Hereinafter, when "viscositye" is mentioned without further specification, it is the viscosity of the mixture of resin and solid fillers, or solid-filled resin.

The filler can be any solid matter (e.g. metal, metal oxide, silica, quartz, ceramics, inorganic salts such as calcium carbonate and barium sulfate) that will bring the LCTE and the viscosity into the ranges defined herein. The filler should preferably be present in the solid-filled resin in an amount of at least 20%, and more preferably above 30%, by weight. The volume percent should preferably be at least 10% and more preferably above 25%.

The ultrasonic field is generated by an ultrasound generator having a power from 50 W to 1000 W and a frequency from 20 kHz to 500 kHz. Examples of typical commercial units are Ultrasonic Benchtop Cleaners of different volumes, such as Models 1210 MTH–8210 MTH, of Electron Microscope Services Inc., or ultrasonic baths of Labline Inc. at 35 kHz with volumes of 0.8 to 10 L with adjustable power.

The ultrasonic field enables the spaces between the fibers to be completely filled despite the high viscosity of the solids-filled resin. The solids-filled resin is of such a composition that its linear coefficient of thermal expansion (LTCE) is sufficiently low to be compatible with that of the hollow carbon or other inorganic fibers, and thus to allows the potted hollow fiber bundle to be operated over a relatively wide temperature range.

The high solids loading, and consequently enhanced viscosity, solves two problems at once:
 a. The ability to reach low LCTE's (<30, e.g. 24–28 ppm/C)
 b. The reduction of the wicking.

However, a higher viscosity of the filled or unfilled potting resin would normally prevent penetration and filling of small spaces between fibers and cause gaps to be left. The invention permits to use high viscosity (highly solids-filed) resins, and yet completely to fill the spaces between the fibers of the bundle.

An apparatus for carrying out the method hereinbefore described is also part of the invention. Said apparatus comprises a mold, means for injecting into the mold a resin filled with solids, and an ultrasonic field generator for applying an ultrasonic field to the resin while it is being injected.

DETAILED DESCRIPTION OF PREFERRED EMBODIMENT

The following are illustrative embodiments of the invention.

The end of a bundle of hollow carbon fibers, typically anywhere from 1000 to 100,000, is placed in a cylindrical mold and the mold, with the bundle inside, it is suspended in an ultrasonic bath. The fibers can have outer diameters from 40 to 1500 um, generally from 100 to 500 um, and bore diameters from 20 to 400 um A syringe pump or other injection device, containing a resin of high solids content, is connected to the bottom of the mold. The solid-filled resin is pumped into the mold from the bottom, while the ultrasonic bath is operated at a power from 50 W to 1000 W and at a frequency from 20 kHz to 500 kHz. The solid-filled resin is of such a composition that it possesses the LTCE, viscosity, and surface tension properties hereinbefore defined, The ultrasonic bath is operated as long as the mold is being filled. The ultrasonic field is turned off as the potting resin is approaching its final height, to help prevent wicking. If a module allowing feed though the lumen is desired the other end of the fiber bundle is subsequently potted in a similar mold by the same method, after the resin has been cured at the first end.

One of the unexpected aspects of the application of ultrasound to applying the potting resin is, that it is effective on both thixotropic and non-thixotropic resin formulations.

Figure 1:
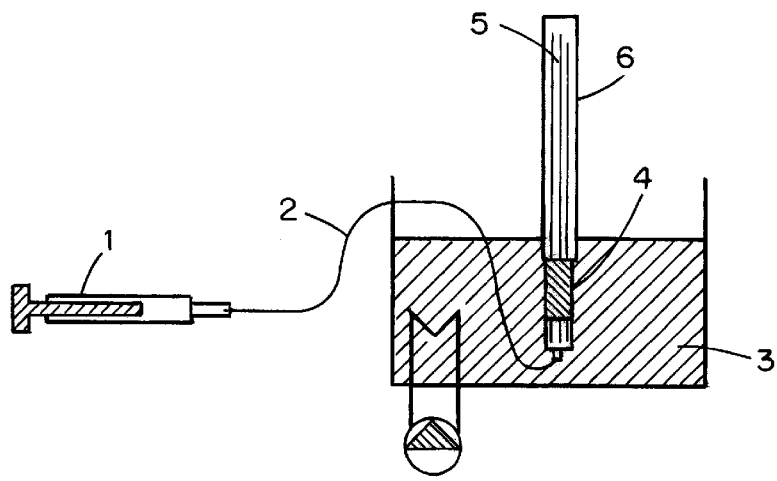
FIG. 1 is a general layout of the mold containing a hollow fiber bundle to be potted inside a ultrasonic bath, with the solid-filled resin injected by a syringe or other type pump.

The general layout of the method for preparing tube sheets around hollow fiber bundles with highly viscous filled resin materials is shown in FIG. 1. A syringe pump or other kind of positive displacement pump (1) is used to insect the highly viscous potting resin through a flexible line (2) into a the bottom of a mold (4) holding a hollow fiber bundle (5), protected by a glass tube (6) where the mold is submerged in a thermostated ultrasonic bath.

The resin can be any filled epoxy or other thermosetting resin with a viscosity of 10,000 to 100,000 cps having an LCTE of 45 ppm/C or less and preferably less than 30 ppm/C when working with hollow fibers of glassy carbon. For viscosities less than 10,000 cps, the ultrasonic field may not be necessary to get complete bundle penetration, but then the lower viscosity leads to wicking, which undermines the stability of the tube sheet to thermal cycling, as illustrated hereinafter in the Examples. As has been said, the thermosetting resin can be thixotropic or non-thixotropic and can be filled with any filer (metal, metal oxide, silica, glass or ceramic) that will bring the LCTE and the viscosity into this range. An example of a thixotropic, filled resin which is appropriate for this invention is that of resin Aremco 805 (Aremco Inc.) which has an LCTE of 45 ppm/C and viscosity of 85,000 cps.

While one might try to explain the operation of the ultrasound, when a thixotropic resin is used, as causing shear-thinning aid local reduction of viscosity, whereby to allow penetration of the fiber bundle, this explanation could not apply to non-thixotropic resins, and yet it has been found that nonthixotropic filled resins with appropriate viscosity can also be used in carrying out the invention. An example of a suitable non-thixotropic, filled resin is Epusil EP-140 (Polymer Gvulot, Ltd) with an LCTE of 24 ppm/C and viscosity of 30,000 cps.

The resin can be injected into the mold at such a rate that it will rise into the bundle, between the fibers, at a linear rate of from 0.05–0.8 cm/min and preferably from 0.1–0.3 cm/min.

The ultrasonic bath is preferably filled with water, mineral oil, or any other material which can transfer the ultrasonic field to the submerged mold and be heated to the required temperature. However, the mold does not necessarily have to be submerged in a bath, and e.g., an ultrasonic horn or a series of ultrasonic horns could be attached directly to the outside of the mold. The bath can be heated to any temperature that is part of the curing program of the resin. The ultrasonic field can be applied during part or all of the time of injecting the resin and can be applied also during part or all of the curing cycle after injection. One preferred method is to apply the ultrasonic field until the injection is almost complete, and then to turn it off for the last minute or less of injection time. This aids in preventing wicking. Another preferred method is to only apply the ultrasonic field during the injection of the resin into the mold and not during any part of the curing cycle of the resin. The ultrasound frequency can be from 20–500 kHz, but is preferably from 20 to 80 kHz.

The hollow fiber bundle is kept more or less vertically in the mold. The mold may be made removable by using a plastic material or metal and providing it with mold release means with such that the formed tube sheet can be freed from the mold. If this is done, the operation is called casting. Alternatively the mold can be a metal or plastic form which is part of the hollow fiber membrane module structure (e.g. as taught by U.S. Pat. No. 4,929,529) and is not removed from the formed tube sheet after curing. If this is done, the operation is called potting. This invention applies both to potting and casting. Methods known to persons skilled in the art of potting can be used to enhance the adhesion of the resin to the vessel or mold, such as roughening the surface of the mold by sand-blasting, etching or other means.

Figure 2:
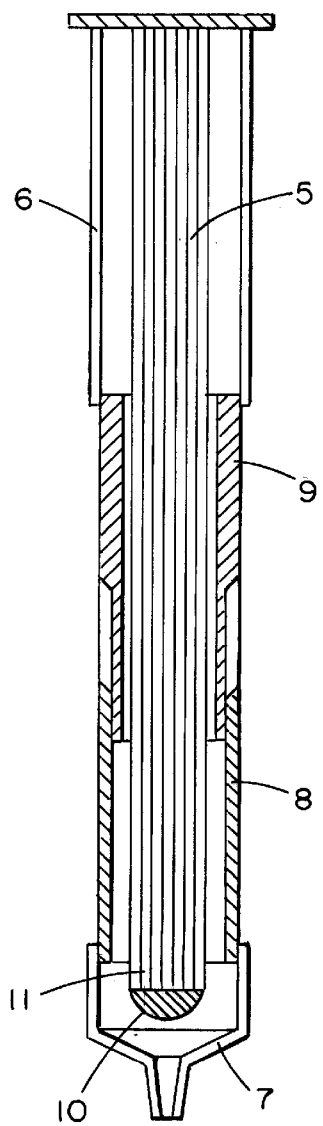
FIG. 2 is a detail of the potting mold, showing the hollow fiber bundle and level of potting relative to the level of the ultrasonic bath.

A particular embodiment of the mold for the hollow fiber tube sheet is shown in FIG. 2 and contain elements of both casting and potting. The medium of the ultrasound bath (3) surrounds the mold and, in a preferred embodiment, extends to just below the upper surface of the fiber bundle (fiber bundle end of the tube sheet). This has the desired effect that the ultrasound field declines at the top of the mold, so that resin, that have a tendency to rise above the general injection front, slows down as the ultrasonic field intensity decreases. This in general leads to a general reduction in wicking. The resin is injected into a mold formed from a connecting fitting (7), to which the injection line can be connected, and a removable plastic sleeve (8), which is stable to the temperatures of the cure cycle but non-adhesive to the resin. This allows a portion of the tube sheet to be exposed for various purposes such as in situ repair of broken fibers as taught, e.g. in U.S. Pat. No. 5.575,963. The plastic sleeve is connected to a metal sleeve (9) which forms part of the module housing and to which the resin is intended to adhere. The resin LCTE should be reasonably matched to this sleeve: typical LCTE's for the metal sleeve are in the range of 20–30 ppm/C. The fiber bundle (5) is sealed at the bottom end with a resin (10) such as a quick-cure epoxy to prevent the resin from entering the fiber lumens. The potted portion of the fiber bundle extends to just below the top surface of the metal sleeve (9) and just below the surface of the ultrasound bath (3). The free part of the fiber bundle above the potting mold is supported by a rigid tube (6) to which the upper end of the fiber bundle is loosely attached, to prevent the weight of the fiber bundle from causing the fiber bundle to bow out laterally over the top edge of the metal sleeve (9). Normally the upper end of the fiber bundle is also sealed with a quick epoxy resin.

In a typical embodiment and application of the invention, the resin is preheated to 40° C. and injected into the mold while operating the ultrasound bath and maintaining the bath temperature at 40° C. during injection. The ultrasound is turned off when the injection of the resin is complete or up to a minute prior to completion of the injection. The potted fiber bundle with resin is maintained at the bath temperature for 6–8 hours before completing the cure cycle. To complete the cure cycle, the potted fiber bundle with mold and support tube are placed in an oven with a controlled temperature program, according to the instructions of the resin manufacturer. If the top of the fiber bundle has been sealed with a non-filled resin such as a quick-setting epoxy, then the top of the fiber bundle is kept outside of the oven, since non-matching of the LCTE's of the fibers and the epoxies can lead to fractures at that point.

EXAMPLES

Reference is made to FIG. 2. In the examples, a mold of 11 mm inner diameter was used to pot 1000 hollow fibers of glassy carbon membrane prepared according to EPA No. 95103272.1. After curing the potted material, the plastic sleeve (8) was removed and the sealed end of the fiber bundle (11) was cut off to expose the bore of the fibers. If the degree of penetration of the resin was to be examined, then successive slices of the potted end of the tube sheet were cut off up to the bottom of the metal mold. Once the supporting rigid tube (6) had been removed, the top of the tube sheet could be examined for signs of wicking.

A method was used for testing the resistance of the potted fiber bundle to thermal cycling. After the potted bundle was removed from the plastic sleeve (8) and the ends of the hollow fibers opened at the bottom of the tube sheet, the fiber bundle with its metal sleeve was mounted in a pressure housing, such that a low permeating gas such as $N_2$ could be applied at 1–10 bar to the open lumens at the bottom of the tube sheet while the shell side was isolated from applied gas pressure. The pressure housing was placed with the tube sheet open-bore end inside an oven and the closed end of the fiber outside the oven. The shell side of the pressure housing extending out of the oven was connected to a flow meter. The tube sheet was then subjected to a series of temperature cycles under pressure between room temperature and 70–120°C. If the potting was stable, no flow increase was observed beyond that expected for the initial permeance to nitrogen Example 1 (Comparative)

This example illustrates the effect of using a non-filled epoxy. It shows that a wicking of non-filled epoxy leads to failure of the tube sheet under thermal cycling where the carbon fiber bundle exits the tube sheet.

A mold was prepared as in FIGS. 1 and 2, but without the use of an ultrasound bath, and the fiber bundle potted with a high temperature epoxy resin Trabond 2202 (Tracon Inc, Mass.). This resin, as such, has a low viscosity of 1760 cps at room temperature and an LCTE of 105 ppm/ C. The cure schedule used was 2 hours at 65° C. and 8 hours at 115° C. The cured resin was found to adhere tightly to the fiber and to completely penetrate the bundle. Examining the tube sheet at the fiber bundle end showed wicking of 2–3 cm above the tube sheet surface. The module was tested in thermal cycling between room temperature and 70° C. After 1–3 cycles, a large leak developed as measured by 10 SLPM or more of nitrogen flow on the shell side under only 1 bar of pressure. On removing the fiber bundle from the pressure vessel, it was found that numerous fibers were leaking from the region of wicking above the tube sheet.

Example 2 (Comparative)

This example shows the effect of using a filled, highly viscous, epoxy resin without ultrasound.

A mold was assembled as described in FIG. 2 and filled with a 1000 fiber bundle of carbon hollow fiber membranes. The bundle was injected with Epusil EP-140, which is a special solid-filled epoxy resin that contains 75% of ceramic filler by weight, and 40%–60% of ceramic filler by volume, with the addition of Epcure 119n hardener (both supplied by Polymer Gvulot. Ltd.), in proportions by weight of 100 to 5. The resin has a room temperature viscosity of 30,000 cps. This resin was found to be non-thixotropic, as determined by measuring the viscosity of the resin under shear using ASTM-D-2398. The bundle was injected with the potting resin without operating the ultrasonic bath (3 in FIG. 1). The curing schedule was 6–8 hours at room temperature followed by 4 hours at 60° C., 2 hours at 80° C., 2 hours at 100° C. and 2 hours at 120° C.

Figure 3:
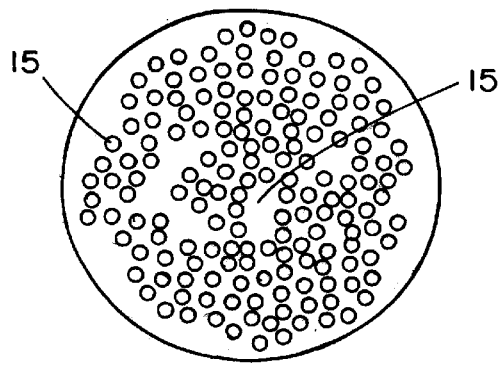
FIG. 3 is a schematic view of a tube sheet with a hole in it caused by incomplete penetration of the potting resin to the center of the fiber bundle.

Afterwards the plastic sleeve was removed and the exposed end of the cure tube sheet was sectioned. On examination of the cross sections, the tube sheet was found to have open channels 15 in it, as illustrated in FIG. 3.

Example 3

In this example, a highly viscous thixotropic resin was used for potting a hollow fiber bundle under ultrasound.

A carbon membrane hollow fiber bundle of 1000 fibers was placed in a mold, as illustrated in FIG. 2. The metal sleeve (9) was roughened by sand blasting. It was then potted with Aremco-Bond™805A which is a mixture of an epoxy resin that contains 63% of ceramic filler by weight, and 39% of ceramic filler by volume, with the addition of Aremco-Bond™805B hardener, in the proportions of 100 to 12 by weight. The resin has a room temperature viscosity of 85,000 cps, and is thixotropic. The resin was injected at a rate of 0.2 cm/min, while operating the ultrasound bath It was injected to within 5–10 mm of the top of the metal sleeve. After injecting the resin, the ultrasound field was turned off, and the potted bundle was cured during 2 hours at 40° C., and afterwards it was allowed to cool to room temperature. A post cure was done at ~90° C. for 2 hours.

Figure 4A:
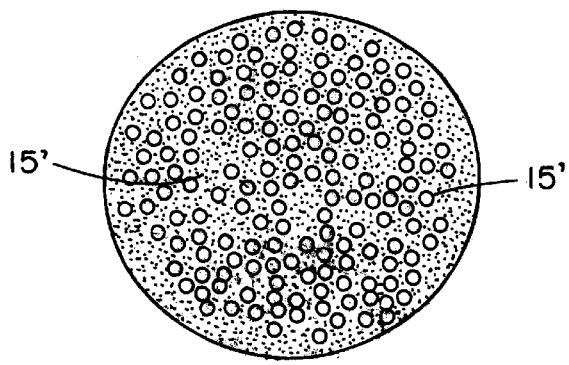
FIGS. 4a and 4b show the cross-sections and longitudinal sections respectively of a hollow fiber tube sheet formed according to an embodiment of the invention.
Figure 4B:
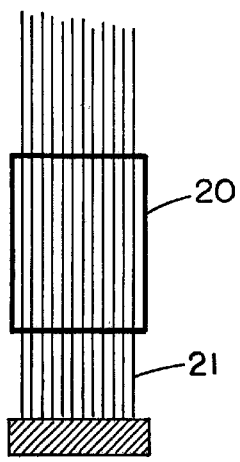

The potted tube sheet was examined by sectioning and the results, as illustrated in FIGS. 4a and 4b, show that the penetration was complete and almost no wicking (<5 mm) occurred. In FIG. 4b rectangle 20 around the fiber bundle represents the metal sleeve in which the fiber bundle is potted. The darker shading 21 of the bundle at its bottom end represents the potting resin and shows that there is little wicking. In FIG. 4a the zones 15', corresponding to zones 15 of FIG. 3, are seen to be filled with resin.

A second fiber bundle was potted and mounted in a pressure module and thermally cycled under pressure. It was shown to be stable to repeated thermal cycles between 90° C. and room temperature under a pressure of at least 8 bar.

Example 4

This example illustrates the potting of the fiber bundle under ultrasound, using a non-thixotropic filled epoxy resin.

A carbon membrane fiber bundle was potted as in Example 3, and the ultrasound bath, in which the mold was immersed, was operated during the entire period of injecting resin into the fiber bundle. The same resin was used as in Example 2, with the same curing schedule, but with the said additional use of ultrasound as in Example 3. After curing the potted tube sheet, the plastic sleeve was removed and the tube sheet was sectioned. The appearance of the tube sheet is illustrated in FIG. 4a, and is the same as that of Example 3.

A second fiber bundle was potted in the same manner and subsequently mounted in a pressure housing and subjected to thermal cycling under pressure for over a week. It was stable to thermal cycling between room temperature and 120° C. under applied pressure of at least 8 bar.

While embodiments of the invention has been described by way of illustration, it will be apparent that the invention may be carried into practice with many modifications, variations and adaptations, without departing from its spirit or exceeding the scope of the claims

What is claimed is:

1. A method for potting or casting hollow fiber bundles and form a tube sheet as part of fabricating a gas separation membrane module, comprising the steps of placing a hollow fiber bundle in a mold, injecting into the mold a resin filled with solids, and exposing the resin to an ultrasonic field in a liquid bath in which the mold is immersed while it is so injected to form the tube sheet.

2. A method according to claim 1, wherein the resin is a thermosetting, thixotropic or non-thixotropic, resin.

3. A method according to claim 1, wherein the resin is chosen from among epoxy and polyurethane resins.

4. A method according to claim 1, wherein the solids that fill the resin are chosen among metals, metal oxides, silica, quartz, ceramics and inorganic salts.

5. A method according to claim 1, wherein the ultrasonic field is generated by an ultrasound generator having a power from 50 W to 1000 W and a frequency from 20 kHz to 500 kHz.

6. A method according to claim 1, wherein the resin is exposed to the ultrasonic field during the entire period of its injection into the mold.

7. A method according to claim 1, wherein the hollow fibers are inorganic membranes with a linear coefficient of thermal expansion of no more than 100 ppm/C.

8. A method according to claim 7, in which the inorganic membranes are glassy carbon membranes.

9. A method according to claim 1, wherein the hollow fiber bundle consists of carbon fibers.

10. A method according to claim 9, wherein filled resin substantially matches the LCTE of the carbon fibers and that of the metal walls of the cylindrical mold in which the fiber bundle will be mounted in the pressure the mold is cylindrical and has metal walls, and the linear coefficient of thermal expansion of the resin filled with solids matches the linear coefficient of thermal expansion of the carbon fibers and of said metal walls.

11. A method according to claim 9, wherein the resin filled with solids has a linear coefficient of thermal expansion of 4 to 50 ppm/C, a viscosity of 1000 cps to 100,000 cps, and such a surface tension that it wets the carbon fibers well.

12. A method according to claim 11, wherein the resin filled with solids has a linear coefficient thermal expansion of 10 to 30 ppm/C and a viscosity between 10,000 cps and 80,000 cps.

* * * * *

UNITED STATES PATENT AND TRADEMARK OFFICE
CERTIFICATE OF CORRECTION

PATENT NO. : 6,270,714 B1
DATED : August 7, 2001
INVENTOR(S) : Avraham Azran and Gil Dagan It is certified that error appears in the above-identified patent and that said Letters Patent is hereby corrected as shown below:

Column 10,
Lines 11-14, "filled resin substantially matches the LCTE of the carbon fibers and that of the metal walls of the cylindrical mold in which the fiber bundle will be mounted in the pressure" should be deleted.

Signed and Sealed this

Third Day of September, 2002

*Attest:*

*Attesting Officer*

JAMES E. ROGAN
*Director of the United States Patent and Trademark Office*